United States Patent
Byun et al.

(10) Patent No.: US 8,962,180 B2
(45) Date of Patent: Feb. 24, 2015

(54) RECHARGEABLE BATTERY INCLUDING OVERLAPPING FIRST AND SECOND GASKETS BETWEEN TERMINAL AND CAP PLATE

(75) Inventors: Sang-Won Byun, Jyunggi-do (KR); Sung-Bae Kim, Jyunggi-do (KR); Kyu-Won Cho, Jyunggi-do (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 585 days.

(21) Appl. No.: 12/926,517

(22) Filed: Nov. 23, 2010

(65) Prior Publication Data
US 2011/0287310 A1   Nov. 24, 2011

(30) Foreign Application Priority Data

May 19, 2010   (KR) .................. 10-2010-0047047

(51) Int. Cl.
| | |
|---|---|
| *H01M 2/04* | (2006.01) |
| *H01M 2/06* | (2006.01) |
| *H01M 2/08* | (2006.01) |
| *H01M 2/26* | (2006.01) |
| *H01M 2/30* | (2006.01) |

(52) U.S. Cl.
CPC .............. *H01M 2/06* (2013.01); *H01M 2/0413* (2013.01); *H01M 2/08* (2013.01); *H01M 2/30* (2013.01)
USPC ........... 429/181; 429/161; 429/178; 429/179; 429/180

(58) Field of Classification Search
USPC .......................... 429/181, 161, 178, 179, 180
See application file for complete search history.

(56) References Cited

U.S. PATENT DOCUMENTS

| | | | |
|---|---|---|---|
| 7,807,285 B1* | 10/2010 | Berg et al. ........................ | 429/97 |
| 2003/0077511 A1* | 4/2003 | Mizuno et al. ................. | 429/181 |
| 2010/0143786 A1* | 6/2010 | Kim ................................ | 429/158 |
| 2011/0052949 A1* | 3/2011 | Byun et al. ...................... | 429/61 |

FOREIGN PATENT DOCUMENTS

| | | |
|---|---|---|
| JP | 2000-113865 A | 4/2000 |
| JP | 2001-185100 A | 7/2001 |
| KR | 10-0670428 B1 | 1/2007 |
| WO | WO 9905896 A1 * | 2/1999 |

OTHER PUBLICATIONS

Korean Office Action in KR 10-2010-0047047, dated Jul. 19, 2011 (Byun, et al.).
Korean Notice of Allowance in KR 10-2010-0047047, dated Feb. 8, 2012 (Byun, et al.).

* cited by examiner

*Primary Examiner* — Sean P Cullen
(74) *Attorney, Agent, or Firm* — Lee & Morse, P.C.

(57) ABSTRACT

A rechargeable battery including an electrode assembly; a case in which the electrode assembly is installed; a cap assembly coupled to an opening of the case and to an externally protruded terminal, the cap assembly including a cap plate; a first gasket between the terminal and the cap plate; and a second gasket between the terminal and the cap plate, the second gasket having a blocking portion overlapped with the first gasket.

9 Claims, 6 Drawing Sheets

RECHARGEABLE BATTERY INCLUDING OVERLAPPING FIRST AND SECOND GASKETS BETWEEN TERMINAL AND CAP PLATE

BACKGROUND

1. Field

Embodiments relate to a rechargeable battery.

2. Description of the Related Art

Unlike a primary battery, a rechargeable battery may be iteratively charged and discharged. Low-capacity rechargeable batteries may be used for portable compact electronic apparatuses e.g., mobile phones, notebook computers, and camcorders. High-capacity rechargeable batteries may be used as a power source for driving a motor of, e.g., a hybrid vehicle, etc.

Recently, a high power rechargeable battery that includes a non-aqueous electrolyte having a high energy density has been developed. A battery module may be constituted by a large capacity rechargeable battery in which a plurality of rechargeable batteries are coupled in series in order to use it to drive devices requiring a large amount of power, e.g., motors such as for electric vehicles.

In addition, a large capacity rechargeable battery or a battery module may include a plurality of rechargeable batteries that are coupled in series, and the rechargeable battery may have a cylindrical and/or angular shape.

Since the rechargeable battery may have a structure in which a terminal connected with an electrode assembly protrudes externally therefrom, the terminal may penetrate a cap plate coupled to a case. A gasket may be included with the intention of sealing and insulating between the cap plate and the terminal.

The above information disclosed in this Background section is only for enhancement of understanding of the background of the invention and therefore it may contain information that does not form the prior art that is already known in this country to a person of ordinary skill in the art.

SUMMARY

Embodiments are directed to a rechargeable battery, which represents advances over the related art.

It is a feature of an embodiment to provide a rechargeable battery having improved safety At least one of the above and other features and advantages may be realized by providing a rechargeable battery including an electrode assembly; a case in which the electrode assembly is installed; a cap assembly coupled to an opening of the case and to an externally protruded terminal, the cap assembly including a cap plate; a first gasket between the terminal and the cap plate; and a second gasket between the terminal and the cap plate, the second gasket having a blocking portion overlapped with the first gasket.

The embodiments may be realized by providing a rechargeable battery including an electrode assembly; a case in which the electrode assembly is installed; a cap assembly coupled to an opening of the case and to an externally protruded terminal, the cap assembly including a cap plate having a terminal hole completely penetrating through the cap plate and through which the terminal protrudes; a first gasket between the terminal and the cap plate, the first gasket including a sealing portion; and a second gasket between the terminal and the cap plate, the second gasket having a blocking portion laterally overlapped with the sealing portion of the first gasket such that the sealing portion is between an innermost edge of the terminal hole and the blocking portion of the second gasket, wherein the second gasket includes a base tightly adhered to an inner surface of the cap plate, and a stepped portion in the terminal hole in the cap plate, and wherein the blocking portion protrudes toward the first gasket from the stepped portion, the blocking portion having a thickness that is smaller than a thickness of the stepped portion and being tightly adhered to an external circumferential surface of the terminal.

The blocking portion of the second gasket may have a pipe shape.

The cap plate may include a terminal hole through which the terminal protrudes, and the first gasket may include a sealing portion between the blocking portion of the second gasket and an edge of the terminal hole.

The sealing portion of the first gasket may have a pipe shape.

The first gasket may contact a first side of the cap plate, and the second gasket may contact a second side of the cap plate, the second side facing an opposite direction from the first side.

The first side of the cap plate may be an outer surface exposed to an outside of the rechargeable battery, and the second side of the cap plate may be an inner surface facing an inside of the case.

In an overlapped portion of the first and second gaskets, the first gasket may contact the cap plate and the second gasket may contact an external circumferential surface of the terminal.

The first gasket may include a support portion tightly adhered to the first side of the cap plate, and a sealing portion protruding toward the second gasket from the support portion and being overlapped with the blocking portion.

The first gasket may further include a guide portion protruding from the support portion, the guide portion having a pipe shape.

The second gasket may include a base tightly adhered to the second side of the cap plate, and a stepped portion in a terminal hole in the cap plate, and wherein the blocking portion protrudes toward the first gasket from the stepped portion, the blocking portion having a thickness that is smaller than a thickness of the stepped portion and being tightly adhered to an outer surface of the terminal.

A lower end of the sealing portion of the first gasket may contact an upper end of the stepped portion of the second gasket.

The cap plate may include a terminal hole through which the terminal protrudes, the terminal hole including a groove in an upper portion thereof.

The first gasket may include a support portion tightly adhered to a first side of the cap plate, and a sealing portion protruding toward the second gasket from the support portion and being inserted to the groove.

The second gasket may include a base tightly adhered to a second side of the cap plate and a blocking portion protrudes from the base and is inserted into the terminal hole, the second side of the cap plate facing an opposite direction from the first side.

At least one of the above and other features and advantages may also be realized by providing a rechargeable battery including an electrode assembly; a case in which the electrode assembly is installed; a cap assembly coupled to an opening of the case and to an externally protruded terminal, the cap assembly including a cap plate; a first gasket contacting a first side of the cap plate, the first gasket being between the terminal and the cap plate; and a second gasket between the first gasket and the terminal and contacting a second side of the cap plate, the second side of the cap plate facing an opposite direction from the first side.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
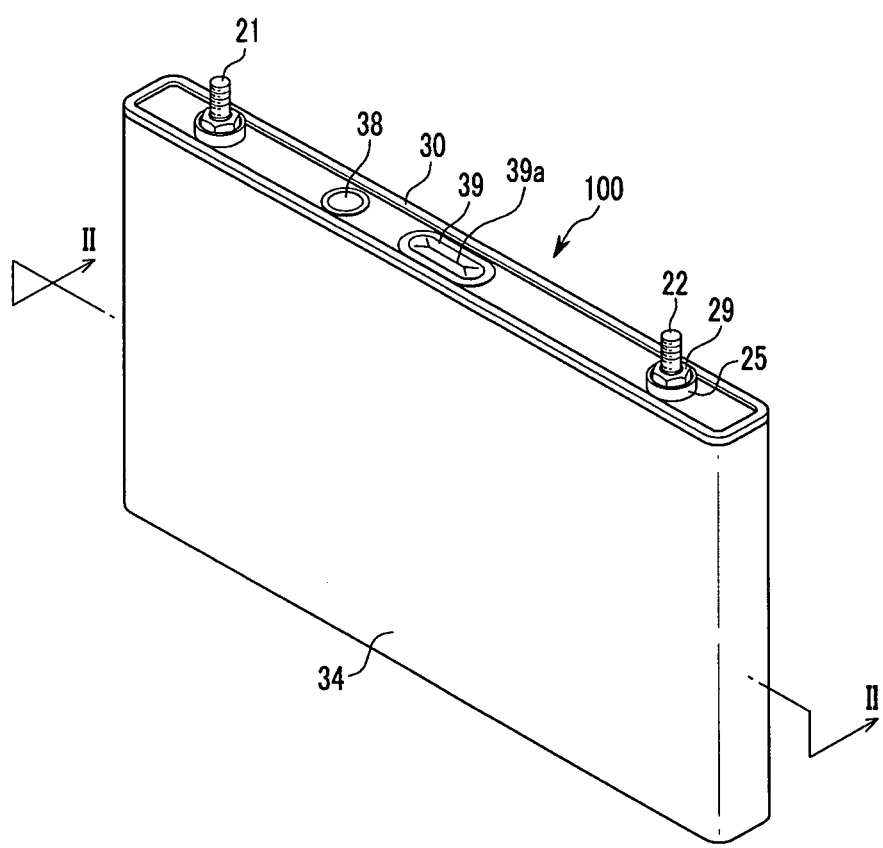
FIG. 1 illustrates a perspective view of a rechargeable battery according to an embodiment.

Korean Patent Application No. 10-2010-0047047, filed on May 19, 2010, in the Korean Intellectual Property Office, and entitled: "Rechargeable Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

Figure 2:
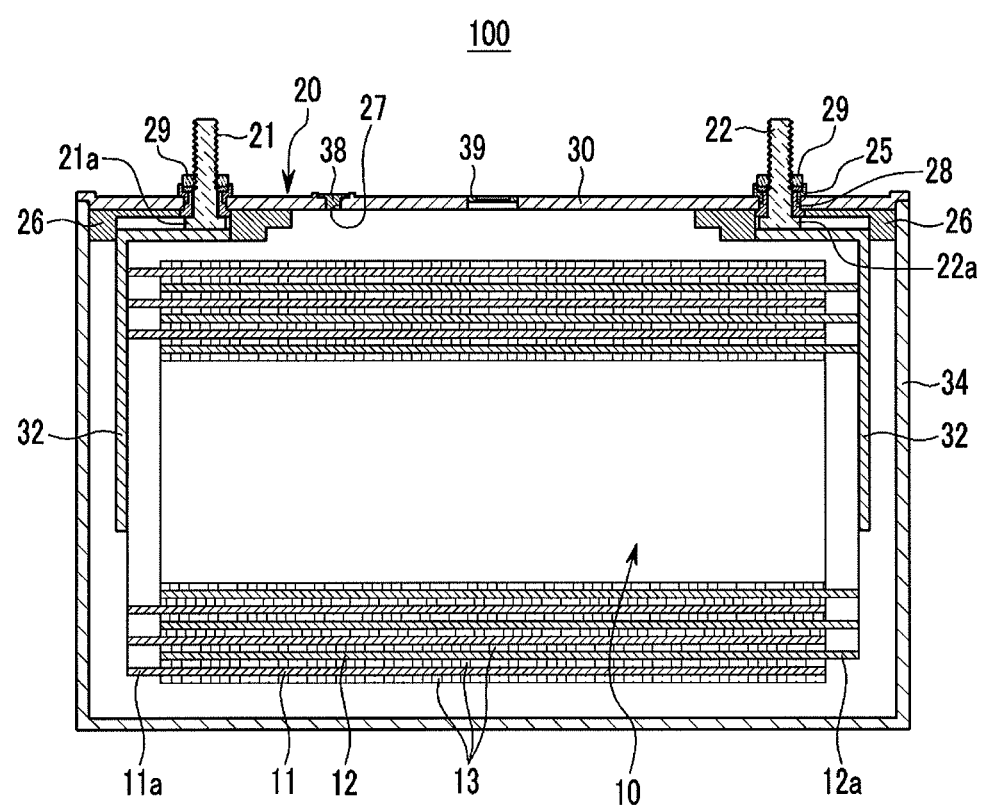
FIG. 2 illustrates a cross-sectional view of FIG. 1, taken along the line II-II.

FIG. 1 illustrates a perspective view of a rechargeable battery according to an embodiment. FIG. 2 illustrates a cross-sectional view of FIG. 1, taken along the line II-II.

Referring to FIG. 1 and FIG. 2, a rechargeable battery 100 according to the present embodiment may include an electrode assembly 10 formed by winding a positive electrode 11 and a negative electrode 12 while interposing a separator 13 therebetween, a case 34 in which the electrode assembly 10 is installed, and a cap assembly 20 coupled to an opening of the case 34.

The rechargeable battery 100 according to the present embodiment may have a square or cuboid shape. However, the embodiments are not limited thereto. That is, various types and shapes of batteries including, e.g., a lithium polymer battery or a cylindrical battery may be used.

The positive electrode 11 and the negative electrode 12 may include coated regions where an active material is coated on a current collector formed from a thin metal foil. The positive electrode 11 and the negative electrode 12 may respectively include positive and negative uncoated regions 11a and 12a where the active material is not coated on the current collector.

The positive electrode uncoated region 11a may be on the positive electrode 11 at one side of the electrode assembly 10 along a length direction thereof. The negative electrode uncoated region 12a may be on the negative electrode 12 at another side of the electrode assembly 10 along a length direction thereof. The first and second electrodes 11 and 12 may be wound after interposing the insulating separator 13 therebetween.

However, the embodiments are not limited thereto; and the electrode assembly 10 may have a structure in which a plurality of positive electrodes and negative electrodes formed in a sheet shape are stacked while interposing a separator therebetween.

The case 34 may substantially have a cuboid shape and an opening may be formed at one side thereof. The cap assembly 20 may include a cap plate 30 covering the opening of the case 34, a positive terminal 21 protruding to an outside of the cap plate 30 and electrically connected with the positive electrode 11, a negative terminal 22 protruding to an outside of the cap plate 30 and electrically connected with the negative electrode 12, and a vent member 39 having a notch 39a that may be broken according to a predetermined internal pressure.

The cap plate 30 may be a thin plate. An electrolyte solution inlet 27 for insertion of electrolyte solution may be formed at one side of the cap plate 30 and a sealing cap 38 for sealing the electrolyte solution inlet 27 may be fixed to the cap plate 30.

A first gasket 25 and a second gasket 28 may be formed between the cap plate 30 and the terminals 21 and 22 for insulation therebetween. In an implementation, the terminals 21 and 22 may include a positive terminal 21 and a negative terminal 22.

The terminals 21 and 22 may have a circular cylinder shape; and a nut 29 that supports the terminal 21 and 22 at an upper portion thereof may be installed on the terminals 21 and 22. In particular, a screw thread may be formed on an external circumference of the terminal 21 and 22 so as to be fastened to the nut 29. At a lower portion of the terminal 21 and 22, terminal flanges 21a and 22a that support the terminal at the lower portion may be formed. If the nut 29 is fastened to the terminal 21 and 22, a space between the terminal 21 and 22 and the cap plate 30 may be sealed by pressing the first gasket 25 and the second gasket 28 by using the respective terminal flange 21a and 22a and the nut 29.

A lower insulation member 26 for insulation may be installed between the terminal flange 21a and 22a and the cap plate 30. A lead member 32 electrically connected with the respective positive electrode 11 or negative electrode 12 may be welded to the terminal flanges 21a or 22a. The terminal flanges 21a and 22a and the lead member 32 may be inserted into a groove in a lower insulating member 26. In this case, the lower insulating member 26 may be stably fixed by being inserted between the terminal flanges 21a and 22a and the cap plate 30.

Figure 3:
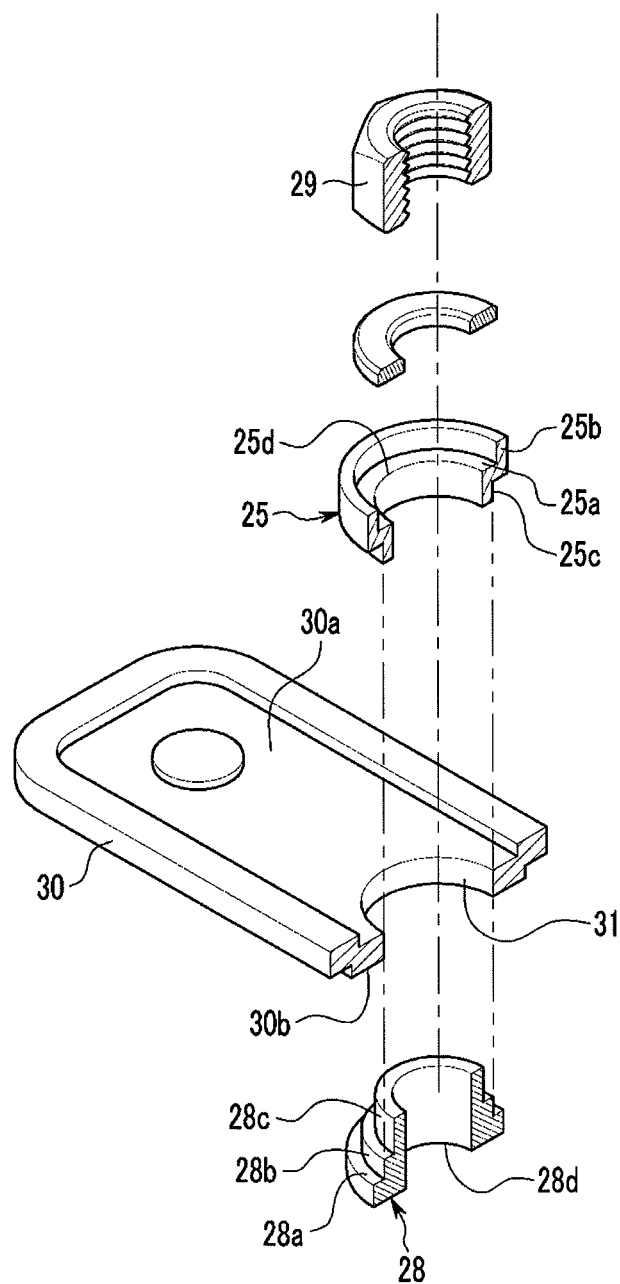
FIG. 3 illustrates a partial exploded perspective view of the rechargeable battery of FIG. 1.
Figure 4:
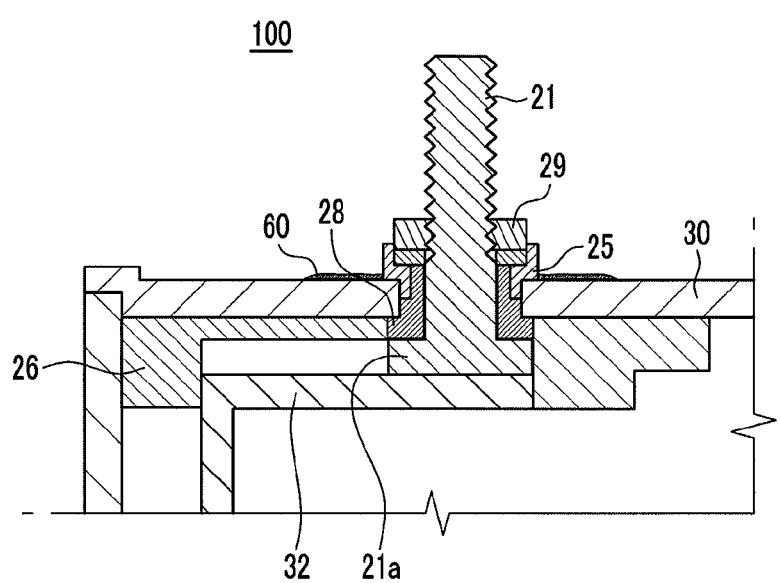
FIG. 4 illustrates a partial cross-sectional view of the rechargeable battery of FIG. 1.

FIG. 3 illustrates a partial exploded perspective view of the rechargeable battery of FIG. 1. FIG. 4 illustrates a partial cross-sectional view of the rechargeable battery of FIG. 1.

Referring to FIG. 3 and FIG. 4, the first gasket 25 in the terminal hole 31 at an upper portion of the cap plate 30 and the second gasket 28 in the terminal hole 31 at a lower portion of the cap plate 30 may be provided between the positive terminal 21 and the cap plate 30. Here, the upper portion and the lower portion of the cap plate 30 may be defined based on an arrangement in which the positive terminal of the rechargeable battery faces upward.

Since the first gasket 25 and the second gasket 28 corresponding to each of the positive terminal 21 and the negative terminal 22 of the rechargeable battery 100 of the present embodiment have the same structure, only the first and second gaskets 25 and 28 of the positive terminal 21 will be described.

The first gasket 25 may contact a first side of the cap plate 30; and the second gasket 28 may contact a second side of the cap plate 30, the second side facing an opposite direction relative to the first side. Here, the first side may be an externally exposed outer surface 30a of the cap plate 30 and the second side may be an inner surface 30b facing the inside of the case 34.

The first gasket 25 and the second gasket 28 may be formed from, e.g., on electrically insulating polymer and the like.

The first gasket 25 may include a support portion 25a contacting the outer surface 30a (i.e., a surface exposed to an external side of the case) of the cap plate 30, a guide portion 25b protruding toward the nut 29 from the support portion 25a, and a sealing portion 25c protruding from the support portion 25a and being inserted into the terminal hole 31. The support portion 25a may have a circular plate or ring shape and may have a hole 25d to accommodate the positive terminal 21 therein. The guide portion 25b may have a cylindrical pipe shape and may protrude upwardly from an external side of the support portion 25a. The sealing portion 25c may have a cylindrical pipe shape and may protrude downwardly from the hole 25d at a center of the support portion 25a.

The second gasket 28 may include a base 28a contacting the inner surface 30b (i.e., a surface facing an inside of the case) of the cap plate 30, a stepped portion 28b protruding from the base 28a and inserted into the terminal hole 31, and a blocking portion 28c protruding toward the first gasket 25 from the stepped portion 28b and having a thickness smaller than that of the stepped portion 28b.

The base 28a may have a circular plate shape and a hole 28d to accommodate the positive terminal 21 may be formed at a center of the base 28a. The stepped portion 28b and the blocking portion 28c may have a cylindrical pipe shape and may protrude upward from a portion where the hole 28d is formed. In an assembled state, the blocking portion 28c of the second gasket 28 may extend toward the support portion 25a of the first gasket 25.

The base 28a may be disposed between the inner surface 30b of the cap plate 30 and the terminal flange 21a and may be compressed by the terminal flange 21a. The inner surface of the stepped portion 28b may be tightly adhered to an external circumferential surface of the positive terminal 21; and an outer surface of the stepped portion 28b may be tightly adhered to an inner surface of the terminal hole 31. The blocking portion 28c may protrude upward from the stepped portion 28b and may have the thickness that is smaller than that of the stepped portion 28b. Therefore, an inner surface of the blocking portion 28c may be tightly adhered to the external circumferential surface of the positive terminal 21; and a space may be formed between an external surface of the blocking portion 28c and the inner surface of the terminal hole 31.

In an assembled state, the sealing portion 25c of the first gasket 25 may be inserted into the space between the blocking portion 28c of the second gasket 28 and the terminal hole 31. An upper portion of the blocking portion 28c may be higher than a lower portion of the sealing portion 25c such that the sealing portion 25c and the blocking portion 28c are overlapped with each other. Thus, the sealing portion 25c and the blocking portion 28c may exist together between the external circumferential surface of the positive terminal 21 and the inner surface of the terminal hole 31 in the overlapped portion.

In this case, the blocking portion 28c of the second gasket 28 may substantially inserted to the hole 25d of the first gasket 25.

According to the present embodiment, if and/or when the cap plate 30 is exposed to a liquid 60, e.g., water, any liquid 60 between the first gasket 25 and the cap plate 30 may not move toward the positive terminal 21 by passing the blocking portion 28c due to overlapped portions of the first and second gaskets 25 and 28. Accordingly, a short-circuit between the cap plate 30 and the positive terminal 21 due to the liquid 60 may be prevented.

If the positive and negative terminals 21 and 22 are short-circuited with the cap plate 30 due to the liquid 60, a significantly large amount of current may flow. Thus, the rechargeable battery 100 may catch on fire or explode. However, a short-circuit may be stably prevented according to the present embodiment so that safety of the rechargeable battery may be improved.

Figure 5:
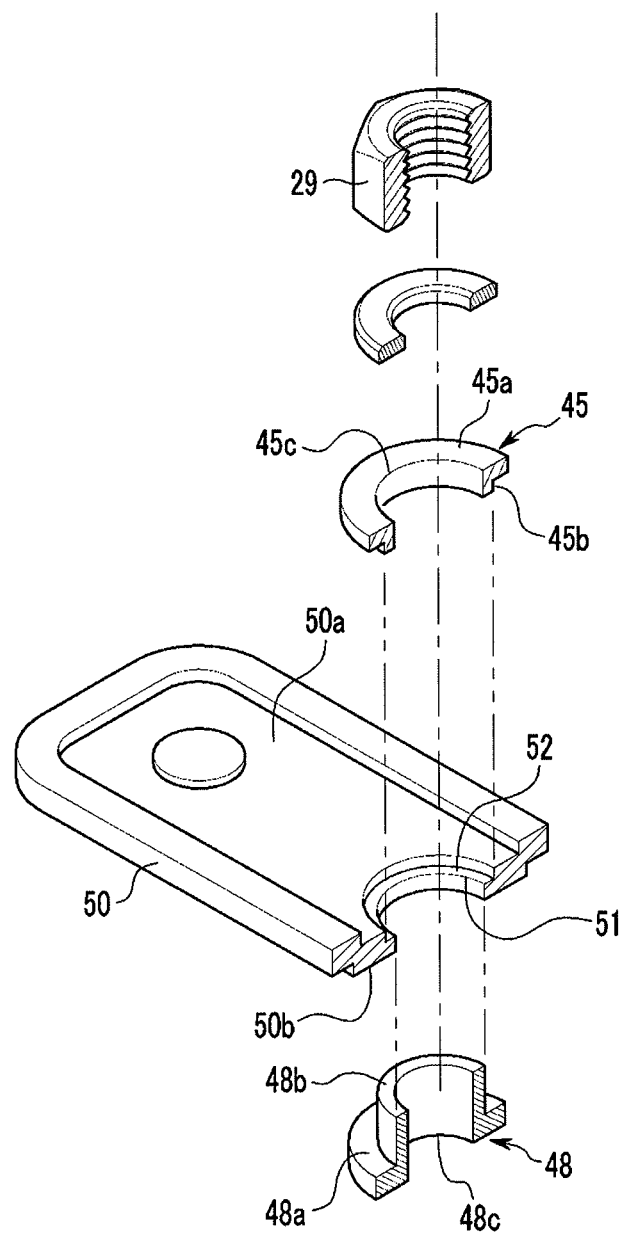
FIG. 5 illustrates a partial exploded perspective view of a rechargeable battery according to another embodiment.
Figure 6:
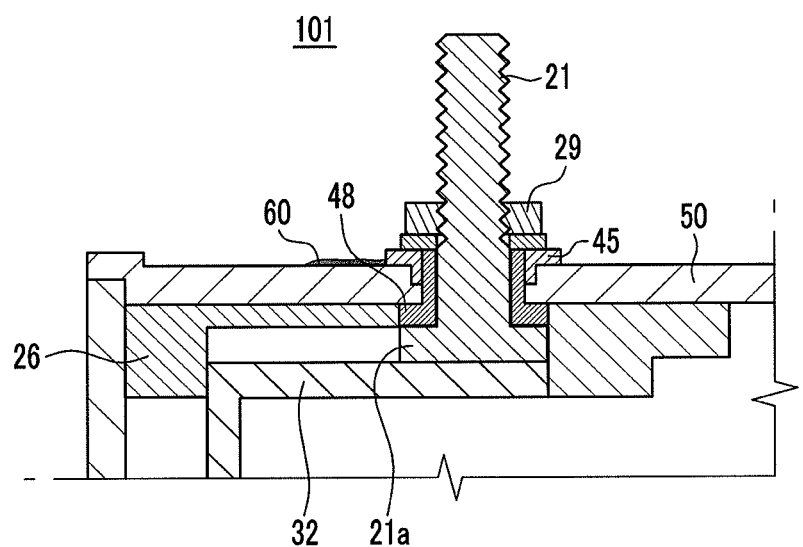
FIG. 6 illustrates a partial cross-sectional view of the rechargeable battery of FIG. 5.

FIG. 5 illustrates a partial exploded perspective view of a rechargeable battery according to another embodiment. FIG. 6 illustrates a partial cross-sectional view of the rechargeable battery of FIG. 5.

Referring to FIG. 5 and FIG. 6, a rechargeable battery 101 according to the present embodiment is the same as the rechargeable battery 100 of the previous embodiment except for a configuration of a cap plate 50, a first gasket 45, and a second gasket 48, and therefore a repeated description of the same structure will be omitted.

A terminal hole 51 through which a positive terminal 21 is inserted may be formed in the cap plate 50. A groove 52 may be formed at an upper end of the terminal hole 51. The groove 52 may extend along or around an upper circumference of the terminal hole 51.

The first gasket 45 may include a support portion 45a contacting an outer surface 50a (i.e., a surface exposed to an outside of the case) of the cap plate 50 and a sealing portion 45b protruding downward from the support portion 45a and being inserted into the terminal hole 51. The support portion 45a may have a circular plate shape and a hole 45c into which the positive terminal 21 is inserted may be formed at a center thereof.

The second gasket 48 may include a base 48a contacting an inner surface 50b (i.e., a surface facing the inside of the case) of the cap plate 50 and a blocking portion 48b protruding from the base 48a and being inserted into the terminal hole 31.

The base 48a may have a circular plate shape and a hole 48c through which the positive terminal 21 is inserted may be formed at a center thereof. The blocking portion 48b may have a cylindrical pipe shape and may protrude upward from a portion where the hole 48c is formed.

The base 48a may be between the inner surface 50b of the cap plate 50 and a terminal flange 21a and may be compressed by the terminal flange 21a. An inner surface of the blocking portion 48b may be tightly adhered to the positive terminal 21 and an outer surface of the blocking portion 48b may be tightly adhered to an inner surface of the terminal hole 51. Since a space may be formed between an inner surface of the groove 52 and the blocking portion 48b of the second gasket 48, the sealing portion 45b of the first gasket 45 may be inserted into the space such that a wall side of the blocking portion 48b and a wall side of the sealing portion 45b contact each other and thus overlap with each other.

In an assembled state, an upper end of the blocking portion 48b of the second gasket 48 may extend toward the support portion 45a of the first gasket 45 so that an upper end of the blocking portion 48b may be higher than a lower end of the sealing portion 45b. Accordingly, even if the cap plate 50 is exposed to a liquid 60, e.g., water, and the liquid 60 permeates between the first gasket 45 and the cap plate 30, the liquid may not move toward the positive terminal 21 by passing the blocking portion 48b so that a short-circuit of the cap plate 50 and positive terminal 21 may be prevented.

Even if the cap plate is exposed to liquid, e.g., water, the embodiments prevent permeation of the liquid through the gasket area, thereby preventing a short circuit between the terminal and the cap plate may. Preventing the short-circuit of the cap plate and the terminal may in turn prevent a short-circuit of the positive and negative electrode, thereby preventing a fire or explosion in the rechargeable battery.

According to an embodiment, a short-circuit between the terminal and the cap plate may be prevented to thereby improve safety of the rechargeable battery.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A rechargeable battery, comprising:
    an electrode assembly;
    a case in which the electrode assembly is installed;
    a cap assembly coupled to an opening of the case and to an externally protruded terminal, the cap assembly including a cap plate having a terminal hole completely penetrating through the cap plate and through which the terminal protrudes;
    a first gasket between the terminal and the cap plate, the first gasket including a sealing portion; and
    a second gasket between the terminal and the cap plate, the second gasket having a blocking portion laterally overlapped with the sealing portion of the first gasket such that the sealing portion is between an innermost edge of the terminal hole and the blocking portion of the second gasket,
    wherein the second gasket includes:
        a base tightly adhered to an inner surface of the cap plate, and
        a stepped portion in the terminal hole in the cap plate, and
    wherein the blocking portion protrudes toward the first gasket from the stepped portion, the blocking portion having a thickness that is smaller than a thickness of the stepped portion and being tightly adhered to an external circumferential surface of the terminal.

2. The rechargeable battery as claimed in claim 1, wherein the blocking portion of the second gasket has a pipe shape.

3. The rechargeable battery as claimed in claim 1, wherein the sealing portion of the first gasket has a pipe shape.

4. The rechargeable battery as claimed in claim 1, wherein:
    the cap plate has an outer surface exposed to an outside of the rechargeable battery and the inner surface of the cap plate faces an inside of the case,
    the first gasket contacts the outer surface and
    the second gasket contacts the inner surface.

5. The rechargeable battery as claimed in claim 4, wherein, in an overlapped portion of the first and second gaskets, the first gasket contacts the cap plate and the second gasket contacts the external circumferential surface of the terminal.

6. The rechargeable battery as claimed in claim 4, wherein the first gasket includes:
    a support portion tightly adhered to the inner surface of the cap plate, wherein
    the sealing portion protrudes toward the second gasket from the support portion and overlaps with the blocking portion.

7. The rechargeable battery as claimed in claim 6, wherein the first gasket further includes a guide portion protruding from the support portion, the guide portion having a pipe shape.

8. The rechargeable battery as claimed in claim 6, wherein a lower end of the sealing portion of the first gasket contacts an upper end of the stepped portion of the second gasket.

9. A rechargeable battery, comprising:
    an electrode assembly;
    a case in which the electrode assembly is installed;
    a cap assembly coupled to an opening of the case and to an externally protruded terminal, the cap assembly including a cap plate having a terminal hole completely penetrating through the cap plate and through which the terminal protrudes;
    a first gasket contacting a first side of the cap plate, the first gasket being between the terminal and the cap plate and including a sealing portion; and
    a second gasket including a blocking portion laterally overlapped with the sealing portion of the first gasket such that the sealing portion is between an innermost edge of the terminal hole and the blocking portion of the second gasket, the second gasket being between the first gasket and the terminal and contacting a second side of the cap plate, the second side of the cap plate facing an opposite direction from the first side,
    wherein the second gasket includes:
        a base tightly adhered to the second side of the cap plate, and
        a stepped portion in the terminal hole in the cap plate, and
    wherein the blocking portion protrudes toward the first gasket from the stepped portion, the blocking portion having a thickness that is smaller than a thickness of the stepped portion and being tightly adhered to an outer surface of the terminal.

* * * * *